United States Patent [19]

Palmer et al.

[11] Patent Number: 5,316,697
[45] Date of Patent: May 31, 1994

[54] CONDUCTIVE, PARTICULATE, FLUORINE-DOPED ZINC OXIDE

[75] Inventors: Bruce R. Palmer; James W. Kauffman, both of Edmond, Okla.

[73] Assignee: Kerr-McGee Corporation, Oklahoma City, Okla.

[21] Appl. No.: 36,528

[22] Filed: Mar. 24, 1993

[51] Int. Cl.$^5$ .................. H01B 1/06; C23C 16/00
[52] U.S. Cl. .................. 252/518; 252/501.1; 427/255.3; 427/255.2; 427/255.1; 427/248.1; 427/126.3; 423/472; 501/151
[58] Field of Search ............... 427/255.3, 255.2, 255.1, 427/248.1, 126.3; 252/518, 501.1; 423/472; 501/151

[56] References Cited

U.S. PATENT DOCUMENTS

| | | | |
|---|---|---|---|
| 3,551,356 | 12/1970 | Bowman | 252/518 |
| 4,705,762 | 11/1987 | Ota et al. | 501/87 |
| 4,882,183 | 11/1989 | Ino et al. | 427/126.6 |
| 4,971,727 | 11/1990 | Takahashi et al. | 252/511 |
| 4,990,286 | 2/1991 | Gordon | 252/518 |
| 5,124,180 | 6/1992 | Proscia | 427/255.3 |

FOREIGN PATENT DOCUMENTS 63-241805 10/1988 Japan.
01-194208 8/1989 Japan.

*Primary Examiner*—Roy V. King
*Attorney, Agent, or Firm*—Herbert M. Hanegan

[57] ABSTRACT

An inventive process for forming a conductive, particulate, fluorine-doped, zinc oxide product which is doped throughout. The process comprises the step of reacting vapor phase reactants in a vapor phase oxidation system and at a temperature sufficient to form the conductive, particulate, fluorine-doped, zinc oxide product. The vapor phase reactants used in the inventive process comprise: elemental zinc vapor; at least one fluorine source; and at least one water source.

16 Claims, No Drawings

CONDUCTIVE, PARTICULATE, FLUORINE-DOPED ZINC OXIDE

FIELD OF THE INVENTION

The present invention relates to conductive, particulate, fluorine-doped, zinc oxide products and to vapor phase reaction processes for producing such products.

BACKGROUND OF THE INVENTION

A need presently exists for an electrically-conductive additive for paints, plastics, papers, and similar products which (a) will provide desirable electrostatic discharge and electromagnetic shielding properties, (b) will provide long service life, (c) is inexpensive to make and use, and (d) will enable the achievement of desired colors and/or transparency.

Carbon black, various metals, certain organic amines and amides, and doped tin oxide have been used heretofore as additives in paints, plastics, and paper products to provide desirable electrostatic discharge and/or electromagnetic shielding properties. However, these additives have significant shortcomings. Carbon black and the various metal additives used heretofore generally hinder and/or prevent the attainment of certain desirable colors and/or transparency. Products containing carbon black are also susceptible to sloughing. Organic amine and organic amide additives, on the other hand, generally have undesirably high solubilities and volatilities. Thus, products containing amine or amide additives typically have short service lives, low durabilities, and poor weather and humidity resistance characteristics. Finally, although doped tin oxide is desirably light-colored and electrically conductive, doped tin oxide is costly to produce.

Zinc oxide is a wide band gap semiconductor which can be made conductive by doping with Group IIIA metal oxides. For example, U.S. Pat. No. 4,990,286 discloses a chemical vapor deposition (CVD) process for coating a substrate surface with a transparent, electrically-conductive, zinc oxyfluoride film. The composition of this zinc oxyfluoride film can generally be represented by the formula $ZnO_{1-x}F_x$ wherein x is a value in the range of from 0.001 to 0.1. The CVD process of U.S. Pat. No. 4,990,286 can be used to produce liquid crystal display devices, solar cells, electrochromic absorbers and reflectors, energy conserving heat mirrors, and antistatic coatings.

In the CVD process of U.S. Pat. No. 4,990,286, the substrate in question is heated and then contacted with a vapor mixture including: a volatile and highly reactive zinc-containing compound, a volatile oxygen-containing compound, and a volatile fluorine-containing compound. The temperature of the heated substrate must be sufficient to induce, for the particular reactants chosen, a film forming deposition reaction. Oxidation occurs and the zinc oxyfluoride film is deposited only as the vapor mixture contacts the heated substrate.

Volatile zinc-containing compounds suitable for use in the CVD process of U.S. Pat. No. 4,990,286 include diethyl zinc and dimethyl zinc. When, for example, the reactants used in the CVD process are diethyl zinc, ethyl alcohol, and hexafluoropropylene, the substrate must be heated to a temperature in the range of from about 350° C. to about 500° C. If the particular substrate in question cannot withstand such temperatures, alternative reaction mixtures having lower film deposition reaction temperatures can be used.

Unfortunately, conductive zinc oxyfluoride films such as those produced by the CVD process of U.S. Pat. No. 4,990,286 are susceptible to sloughing, scratching, and abrasion. Further, due to the difficulty and expense involved in coating large items and items having numerous and/or intricate surfaces, CVD processes do not provide a practical means for producing conductive plastic articles. Moreover, zinc oxyfluoride films of the type produced by the CVD process of U.S. Pat. No. 4,990,286 are not obtained in, and cannot be readily converted to, particulate forms which are suitable for addition to paints, plastics, papers, and other such products.

Other factors also mitigate against the commercial use of CVD-type processes. Due to the highly reactive nature of the zinc-containing compounds required for use in CVD-type processes, the use of such processes on a commercial scale would be quite dangerous. The use of CVD-type processes on a commercial scale would also not be cost effective since (1) the volatile zinc-containing compounds used in these processes are expensive and (2) only a fraction of the zinc-containing compound used in a CVD-type process actually reacts and deposits on the substrate. The requirement that heated substrates be used also reduces the commercial viability of CVD-type processes.

As is well known in the art, non-doped particulate zinc oxides have been produced using vapor phase oxidation processes. Vapor phase oxidation processes used for producing particulate zinc oxide products are generally discussed, for example, in *Kirk-Othmer Encyclopedia of Chemical Technology*, 3rd Edition, John Wiley and Sons, 1978, Volume 24, the entire disclosure of which is incorporated herein by reference.

U.S. Pat. No. 3,551,356 discloses a process for coating a particulate zinc oxide material in order to increase its electrical conductivity. In one embodiment of the process, a reportedly stable and conductive particulate zinc oxide product is produced by heating particulate zinc oxide in a non-oxidizing (preferably nitrogen) atmosphere in the presence of both (1) a fluorine compound and (2) zinc metal vapor. During the heating process, the particulate zinc oxide is preferably maintained at a temperature in the range of from about 600° C. to about 950° C. for a period of about 20 minutes. It is also preferred that moist nitrogen be circulated through the process system during the initial stage of the heating process (i.e., during no more than the first five minutes of the heating period) and that dry nitrogen be circulated through the process system during the remainder of the heating period.

The coating process disclosed in U.S. Pat. No. 3,551,356 and the product produced thereby have numerous undesirable characteristics. The particulate zinc oxide product produced in accordance with U.S. Pat. No. 3,551,356 is only surface coated. Thus, substantial conductivity losses are realized as surface attrition of the particulate product occurs. Additionally, at least two entirely separate processes are required to complete the coating method of U.S. Pat. No. 3,551,356. In the first process, a particulate zinc oxide product is produced and recovered. In the second process, the particulate zinc oxide material is fluorine treated and heat treated. Further, in comparison to the inventive process described hereinbelow, the coating process of U.S. Pat. No. 3,551,356 is very slow.

SUMMARY OF THE INVENTION

The present invention provides a process for forming a conductive, particulate, fluorine-doped, zinc oxide product. The inventive process comprises the step of reacting vapor phase reactants in a vapor phase oxidation system at a temperature sufficient to form a conductive, particulate, fluorine-doped, zinc oxide product which is doped throughout. The vapor phase reactants used in the inventive process comprise elemental zinc vapor, at least one fluorine source, and a water source.

The present invention also provides a conductive, particulate, fluorine-doped, zinc oxide product of the formula $ZnO_{1-x}F_x$ wherein x is a value in the range of from about 0.0009 to about 0.5. The inventive particulate product is doped throughout. The inventive product is produced by a process comprising the step of reacting vapor phase reactants in a vapor phase oxidation system at a temperature sufficient to form the product. The vapor phase reactants used in this process comprise elemental zinc vapor, at least one fluorine source, and a water source.

The vapor phase reactants used in the inventive process preferably consist essentially of elemental zinc vapor, a fluorine source, and a water source. The vapor phase reactants most preferably consist essentially of metallic zinc vapor, hydrogen fluoride, and steam.

The particulate, zinc oxide material provided by the present invention is highly conductive and lightly colored. Thus, it can advantageously be used in plastics, paints, papers, and other products for imparting electrostatic discharge and electromagnetic shielding properties, and/or for achieving colors which are not attainable when using additives such as carbon black. Additionally, the inventive material is not susceptible to sloughing and is essentially nonsoluble and nonvolatile. Consequently, it can be used to form durable, weather-resistant products. Further, the process of the present invention provides a fast, cost-effective, one-step means for producing the inventive zinc oxide material.

Unlike the particulate product produced by the method of U.S. Pat. No. 3,551,356, the inventive particulate product is not merely conductive at the surface. Rather, each particle of the inventive product is doped throughout. Consequently, the conductivity of the inventive product is not substantially affected by surface attrition. Further, unlike CVD-type processes, the inventive process is essentially 100% efficient in zinc metal usage.

Further objects, features, and advantages of the present invention will be readily apparent upon reading the following description of the preferred embodiments.

DESCRIPTION OF THE PREFERRED EMBODIMENTS

Although the specific molecular structure of the inventive fluorine-doped, zinc oxide product is unknown, the inventive product can generally be represented by the formula $ZnO_{1-x}F_x$ wherein x is a value in the range of from about 0.0009 to about 0.5. x is preferably a value in the range of from about 0.001 to about 0.48. The fluorine content of the inventive product, on a weight basis, will generally be in the range of from about 0.02% to about 11.5% by weight based on the total weight of the fluorine-doped product.

The electrical conductivity of the inventive product will generally be in the range of from about 10 to about $1 \times 10^{-8}(ohm-cm)^{-1}$. In the above-noted preferred fluorine content range, the conductivity of the inventive product will generally be in the range of from about 1 to about $1 \times 10^{-5}(ohm-cm)^{-1}$. In contrast to the inventive product, the conductivity of a non-doped particulate zinc oxide produced by vapor phase oxidation will typically be substantially less than $1 \times 10^{-8}(ohm-cm)^{-1}$.

The fluorine-doped, zinc oxide product of the present invention is obtained from the inventive vapor phase oxidation process described hereinbelow in submicron powder form. The particle size of the inventive product will generally be in the range of from about 0.01 to about 0.5 micron. Thus, the inventive product is well-suited for blending with paints, plastics, papers, and other such products.

As indicated above, the inventive, particulate, fluorine-doped, zinc oxide product is produced via a vapor phase oxidation process. The inventive product is preferably produced by reacting elemental zinc vapor with at least one fluorine source and at least one water source in a vapor phase oxidation system at a temperature sufficient for producing a particulate zinc oxide product. Although a very broad range of pressure conditions can be used, the vapor phase oxidation system is preferably maintained at or near atmospheric pressure. The temperature of the vapor phase oxidation system should generally be in the range of from about 300° C. to about 1200° C. The vapor phase oxidation system used in the inventive process is preferably maintained at a temperature of about 850° C. Preferably, before being delivered to the vapor phase oxidation system, each of the reactants is preheated to a temperature which is at least as high as the temperature of the oxidation system.

The inventive process is also conducted in a slightly reducing atmosphere. Such atmosphere can be provided by the presence of hydrogen, a hydrocarbon, or other reducing agent in the vapor phase oxidation system.

In order to avoid the presence of impurities in the inventive zinc oxide product, the elemental zinc vapor used in the inventive process is preferably obtained by vaporizing zinc metal which is at least about 99% by weight pure. The zinc metal vapor can be delivered to the vapor phase oxidation system in vapor form. Alternatively, when, as discussed hereinbelow, the vapor phase oxidation system includes a combustion chamber or other type of combustion zone, the zinc metal vapor can be produced directly in the vapor phase oxidation system by feeding fine zinc metal powder or liquid zinc metal to the combustion zone. As a further alternative in cases where the vapor phase oxidation system includes a combustion zone, elemental zinc vapor can be directly generated in the oxidation system by feeding a combustible zinc compound such as diethyl zinc to the combustion zone. When burned, elemental zinc vapor is liberated from diethyl zinc and the remainder of the compound is combusted.

Examples of fluorine compounds preferred for use in the inventive process include hydrogen fluoride, fluoromethanes, hexafluoropropylene, fluorinated freons, difluoroethylene, vinyl fluoride, chlorotrifluoroethylene, fluorocarbons, perfluorocarbons, and mixed halocarbons containing at least one fluorine atom. The fluorine compound preferred for use in the inventive method is hydrogen fluoride. Hydrogen fluoride is inexpensive, is efficiently used, is easily scrubbed from the process effluent gas, and can be conveniently disposed of. The fluorine-containing compound is preferably vaporized prior to being delivered to the vapor phase oxidation system.

As indicated above, the water source most preferred for use in the inventive method is steam. Steam supplies heat for the reaction system and serves as an excellent source of oxygen and hydrogen. The hydrogen supplied by the steam reactant provides the slightly reducing atmosphere preferred for the inventive process.

Any or all of the vapor phase reactants used in the inventive process can be carried to the vapor phase oxidation system using an inert carrier gas. Examples of such gases include nitrogen and argon. As will be understood by those skilled in the art, the particle size of the inventive product will generally decrease as the amount of dilution gas present in the oxidation system increases.

In order to obtain particulate products having the conductivities and fluorine concentrations set forth hereinabove, the reactants used in the inventive process are preferably delivered to the vapor phase oxidation system in amounts such that: (1) from about 0.0009 to about 0.5 mole (preferably from about 0.001 to about 0.48 mole), expressed as atomic fluorine, of the fluorine compound(s) used in the inventive process is (are) present in the oxidation system per mole of atomic zinc and (2) from about 0.75 to about 100 moles (preferably from about 1 to about 4 moles), expressed as atomic oxygen, of the water source(s) used in the inventive process is (are) present in the oxidation system per mole of atomic zinc.

As used herein and in the claims, the term "vapor phase oxidation system" refers generally to any type of reaction system wherein the reactants used in the inventive process can be and are reacted in the vapor phase. In one preferred alternative, the vapor phase oxidation system can comprise a vessel, tube, or other container which, preferably, is externally heated. In another preferred alternative, the vapor phase oxidation system can comprise a vessel, tube, or other container which is, at least to some extent, directly heated by the introduction of a hot combustion gas. In addition to heating the oxidation system, the combustion gas can provide at least a portion of the water needed for the inventive process.

In yet another preferred alternative, the vapor phase oxidation system used in the inventive method can comprise a combustion chamber or other combustion zone wherein the process reactants are directly heated and/or vaporized. If desired, any or all of the process reactants can be added, in vapor, liquid, or fine-powder form, to the combustion flame. Alternatively, any or all of the process reactants can be added, preferably in vapor form, to the combustion zone at a point downstream of the combustion flame such that the reactants blend with, and are heated by, the hot combustion gases produced by the combustion flame. It is also noted that the combustion of hydrogen and/or hydrocarbon fuel in the combustion zone can provide at least a portion of the water needed in the inventive process.

As will be readily apparent to those skilled in the art, the inventive fluorine-doped, particulate, zinc oxide product can be recovered downstream of the vapor phase oxidation system in the same manner that nondoped zinc oxide products are recovered from vapor phase oxidation systems using, for example, screens, water scrubbers, and/or bag, cloth, or ceramic filters.

The following example is presented in order to further illustrate the present invention.

EXAMPLE

Zinc metal vapor was reacted with hydrogen fluoride in the presence of steam at about 830° C. in a 5 cm diameter INCONEL 600 tube-type reactor. The zinc metal vapor was produced by vaporizing zinc metal in a separate vessel at a rate of 1.1 grams per hour and then carrying the vapor to the reactor using 9 liters per hour of nitrogen. Hydrogen fluoride vapor was fed to the reactor at a rate of 30 mL/hr in combination with 9 liters per hour of nitrogen. Steam was fed to the reactor at a rate of 150 grams per hour in combination with 3 L/hr of nitrogen. All of the nitrogen-diluted vapor reactant streams were externally preheated to 1000° C. using a resistance heater before being delivered to the reactor tube. The reactor was also externally heated using a resistance heater.

About 1.4 grams per hour of a fluorine-doped, particulate, zinc oxide product were recovered from the reactor using an in-line filter and a vacuum pickup. The particulate product was white in color with a light gray tint. X-ray diffraction analysis of the product showed that the product contained no zinc metal or other contaminants. Fluoride analysis of the product showed that the fluoride content of the product was about 1% by weight based on the total weight of the product.

The particulate product was powdery in nature. Additionally, the conductivity of the product was very high. When pressed at 2000 psi, the product powder had a conductivity of about $3 \times 10^{-3} (\text{ohm-cm})^{-1}$.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

We claim:

1. A process for forming a conductive, particulate, fluorine-doped, zinc oxide product which is doped throughout, said process comprising the step of reacting vapor phase reactants in a vapor phase oxidation system at a temperature sufficient to form said conductive, particulate, fluorine-doped, zinc oxide product which is doped throughout, said vapor phase reactants consisting essentially of:
   elemental zinc vapor;
   at least one fluorine source; and
   at least one water source.

2. A process as described in claim 1 wherein said elemental zinc vapor is obtained by vaporizing zinc metal which is at least about 99% by weight pure.

3. A process as described in claim 1 wherein said fluorine source is selected from the group consisting of: hydrogen fluoride, fluoromethanes, hexafluoropropylene, fluorinated freons, difluoroethylene, vinyl, fluoride, chlorotrifluoroethylene, fluorocarbons, perfluorocarbons, and mixed halocarbons including at least one fluorine atom.

4. A process as described in claim 1 wherein said reactants comprise: elemental zinc vapor; a fluorine source; and steam.

5. A process as described in claim 1 wherein said temperature is in the range of from about 350° C. to about 1200° C.

6. A process as described in claim 1 wherein said vapor phase oxidation system comprises a combustion zone including a combustion flame.

7. A process as described in claim 6 wherein, prior to said step of reacting, said reactants are delivered to said combustion flame.

8. A process as described in claim 6 wherein at least a portion of said elemental zinc vapor is generated in said combustion zone by feeding metallic zinc powder or liquid zinc metal to said combustion zone.

9. A process as described in claim 6 wherein at least a portion of said elemental zinc vapor is provided in said combustion zone by feeding metallic zinc vapor to said combustion zone in an inert carrier gas.

10. A process as described in claim 6 wherein at least a portion of said elemental zinc vapor is provided in said combustion zone by feeding a combustible zinc compound to said combustion zone.

11. A process as described in claim 1 wherein each of said reactants is carried to said vapor phase oxidation system by an inert carrier gas.

12. A process for forming a conductive, particulate, fluorine-doped, zinc oxide product comprising the step of reacting vapor phase reactants in a vapor phase oxidation system at a temperature sufficient to form said conductive, particulate, fluorine-doped, zinc oxide product, said vapor phase reactants consisting essentially of:

elemental zinc vapor;
hydrogen fluoride; and
steam.

13. A process as described in claim 12 wherein said temperature is in the range of from about 350° C. to about 1200° C.

14. A process as described in claim 12 wherein said elemental zinc vapor is carried to said vapor phase oxidation system by an inert carrier gas.

15. A process as described in claim 12 wherein said vapor phase oxidation system comprises a combustion zone including a combustion flame.

16. A process as described in claim 15 wherein said elemental zinc vapor is provided in said combustion zone by feeding metallic zinc powder or liquid zinc metal to said combustion zone.

* * * * *